United States Patent [19]

Koenig, III

[11] 4,437,675

[45] Mar. 20, 1984

[54] CHUCK WITH CENTRIFUGAL FORCE COMPENSATION

[75] Inventor: C. Fred Koenig, III, Montgomery, Ohio

[73] Assignee: The Warner & Swasey Company, Cleveland, Ohio

[21] Appl. No.: 397,622

[22] Filed: Jul. 12, 1982

[51] Int. Cl.³ ............................................. B23B 31/14
[52] U.S. Cl. ..................................... 279/1 C; 279/119
[58] Field of Search ........................ 279/1 C, 51, 119

[56] References Cited

U.S. PATENT DOCUMENTS

| | | | |
|---|---|---|---|
| 2,224,639 | 12/1940 | Ward | 279/119 |
| 2,729,459 | 1/1956 | Leifer | 279/1 C |
| 3,464,710 | 9/1969 | Schultz et al. | 279/4 |
| 3,984,114 | 10/1976 | Ovanin | 279/1 C X |
| 4,009,888 | 3/1977 | Wallace | 279/1 C |
| 4,047,723 | 9/1977 | Buck | 279/1 C X |

FOREIGN PATENT DOCUMENTS 776775 11/1980 U.S.S.R. ............................ 279/1 C

*Primary Examiner*—William R. Briggs
*Assistant Examiner*—Glenn L. Webb
*Attorney, Agent, or Firm*—Howard G. Massung

[57] ABSTRACT

A centrifugal force compensated chuck (12) using a moderately sized counterweight (60) and force multiplication to achieve proper compensation. Each counterbalance assembly includes a pair of levers (32, 40) pivotable about a common axis (34). One of the levers (32) is connected through an appropriate mechanical interconnection to an associated chuck jaw (15), the other lever (40) engages a counterweight (60) which moves out from the center of the chuck (12) during rotation. A ratchet (36) and pawl (42) mechanism is provided between the first and second levers. When the chuck (16) is stopped, the counterweight (60), which is spring biased, moves to a position disengaging the ratchet and pawl. With the ratchet and pawl disengaged the pair of levers are free for independent movement about their pivot axis. When the chuck is rotated the counterweight mechanism moves outward and the ratchet (36) and pawl (42) engage causing the pair of levers to move in unison. As the counterweight (60) moves outward the second lever (40) engages a sloped surface (42) on the counterweight and transmits compensating force thru the first lever to the chuck jaw (15). In another embodiment the ratchet and pawl assembly can be eliminated and levers (32, 40) can be formed on a common member.

10 Claims, 6 Drawing Figures

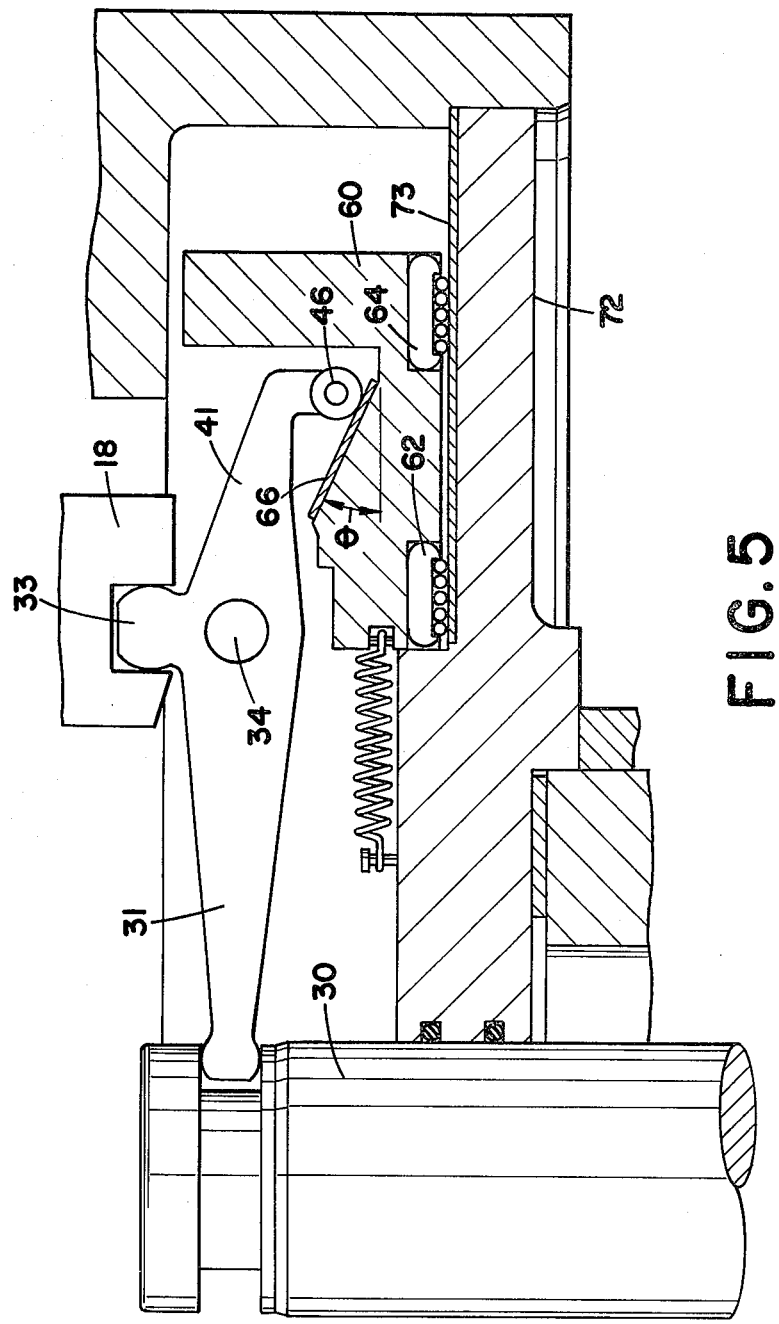

CHUCK WITH CENTRIFUGAL FORCE COMPENSATION

BACKGROUND OF THE INVENTION

1. Technical Field

This invention relates to turning machines and more particularly to a power chuck having centrifugal force compensation.

2. Background Art

Centrifugal counter balance systems are well known in chucks for turning machines. In the usual application a large weight is attached to or made part of each actuating lever which moves an associated chuck jaw. The centrifugal force exerted by this counterweight balances the centrifugal force of the chuck jaw and maintains the desired clamping force on the workpiece at all speeds. The body of the chuck must usually be considerably enlarged to accommodate the counterbalance weights. U.S. Pat. Nos. 2,784,977; 2,839,307; 2,861,471; 2,982,558; 3,370,859; 3,597,822; 3,938,815; 3,984,114; 4,009,888 and 4,040,315 illustrate various prior art chucks having centrifugal force compensation.

DISCLOSURE OF THE INVENTION

The present invention teaches a centrifugal force compensated chuck using a moderately sized counterweight and force multiplication to achieve the desired force compensation. The disclosed chuck has an improved counterbalancing mechanism for use on a high speed turning machine to counteract the centrifugal force tending to move the chuck jaws outward. The counterbalance uses low friction wedge to achieve a large force multiplication from moderately sized counterbalance weight. The disclosed construction does not require changing the proportion of the chuck to accommodate the counterbalance mechanism.

The disclosed chuck has a plurality of chuck jaws and a centrifugal counterweight associated with each chuck jaw. The counterweight mechanism consists of a double ended lever which is movable with the associated chuck jaw, wherein the primary lever is actuated by a central draw bar in the chuck. The secondary lever, integral with the primary level but extended beyond the pivot axis, carries a low friction roller which engages an inclined ramp on counterweight.

When the chuck rotates, the counterweight is moved outward by centrifugal force to engage in the roller on the secondary lever. The centrifugal force of the counterweight is magnified through the inclined ramp and applied to the secondary lever, thus compensating for the centrifugal force of the chuck slide and chuck jaw.

Another embodiment of the invention separates the primary and secondary levers. These two lever arms pivot about the same axis; the primary lever has a ratchet formed on its outward surface and the secondary lever has a spring-biased pawl adjacent to the ratchet. With the chuck stopped the counterweight is at a stopped position disengaging the ratchet and pawl. When the chuck rotates the counterweight moves to release the pawl which then engages the ratchet and causes the two levers to move together. This mechanism allows for a longer stroke of the primary lever than does the one-piece, double-ended lever. Once the pawl is engaged, the centrifugal force of the counterweight, magnified by the inclined ramp, is transmitted through the secondary lever to the chuck slide and chuck jaw. Suitable low friction bearings can be provided to assure low friction movement of the counterweight.

BRIEF DESCRIPTION OF THE DRAWINGS

For a better understanding of the invention, reference may be had to the preferred embodiment exemplary of the invention shown in the accompanying drawings in which:

FIG. 5 is a view of an embodiment of the counterbalance mechanism without the dual levers and connecting ratchet and pawl assembly;

BEST MODE FOR CARRYING OUT THE INVENTION

Figure 1:
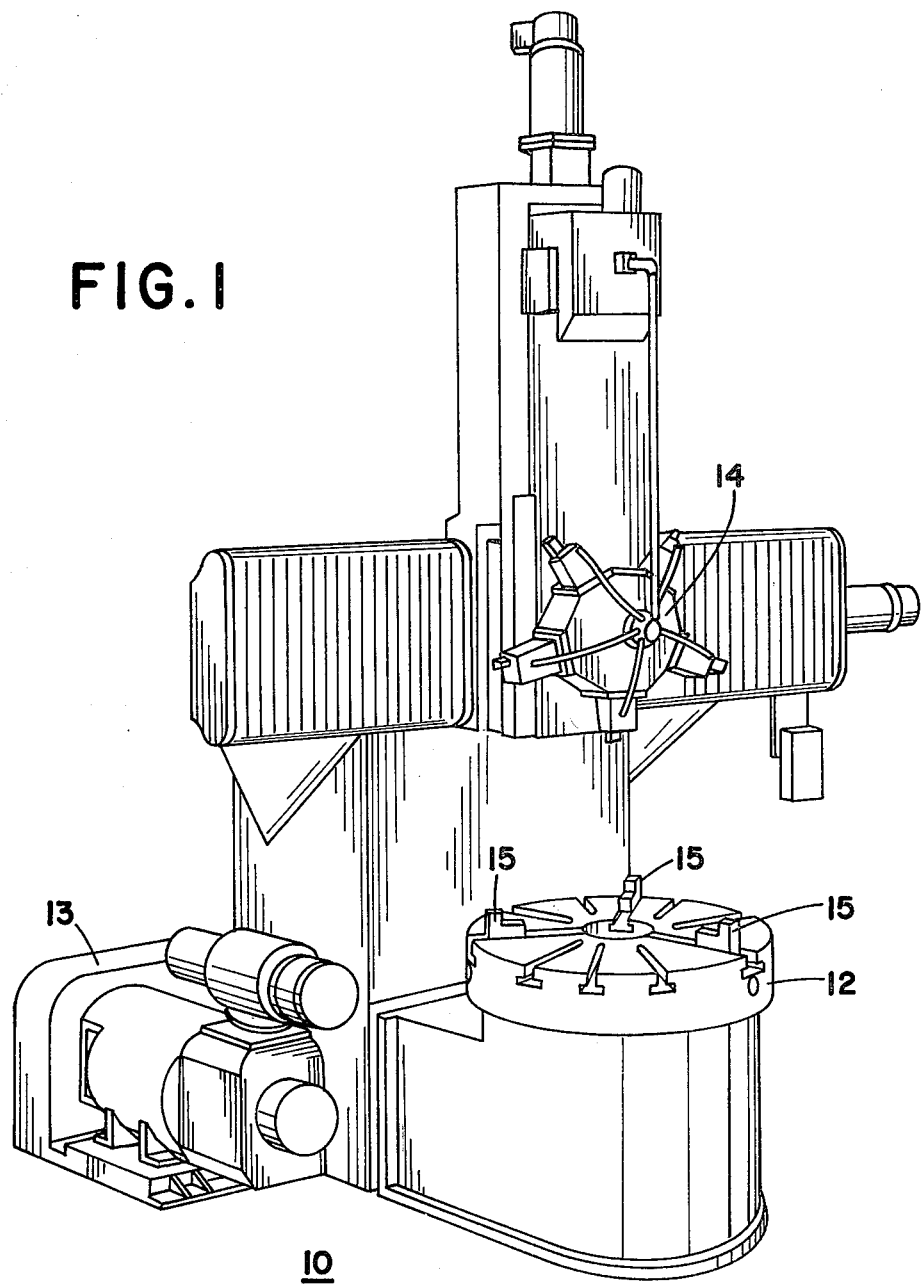
FIG. 1 is a view of a turning machine on which a chuck according to the present invention can be utilized.

Referring now to the drawings there is shown, a turning machine 10 having a chuck 12 which utilizes a counter balance mechanism according to the teaching of the present invention. A workpiece to be machined is supported by chuck 12 and rotated therewith. Suitable drive means 13 are provided for rotating chuck 12. A tool turret 14 is indexable to bring various tools into position for machining the supported workpiece. Turret 14 is supported on vertical and horizontal ways for movement along two axes by appropriate drives.

Chuck 12 consists of a plurality of chuck jaws 15 which are moved to engage a workpiece. Jaws 15 are bolted to and move with chuck slides 16 which are connected to chuck slide nuts 18. A central actuating rod 30 moves vertically to raise or lower a primary lever arm 32. When the primary lever arms 32, one associated with each jaw 15, are raised the chuck slides 16 move outward, when primary lever arms 32 are lowered the chuck slides 16 are moved inward. Thus, workpieces may be engaged and held in either an outward or inward direction depending on the machining operation to be performed. The location of each chuck slide 16 may be adjusted independently by manually turning chuck screw 74 so that the slide moves inward or outward relative to chuck slide nut 18. This adjustment is sometimes necessary to center an irregularly-shaped part about the axis of rotation. Chuck screw 74 is attached to chuck slide 16 by fitted cap 75. One embodiment of the centrifugal force multiplication principle is illustrated in FIG. 5. Lever arm 31 engages central actuating rod 30, which moves vertically to raise or lower the lever arm and move chuck slide 18 which engages an upward extension 33 of lever arm 32. An outward extension 41 of lever arm 31 carries a roller 46 mounted on a low friction bearing. This roller 46 is positioned to engage inclined ramp 66 of counterweight 60 when the counterweight moves outward under centrifugal force. The centrifugal force of counterweight 60 is thus transmitted through lever arm extension 41 to lever arm 31 and to chuck slide nut 18 to balance the centrifugal force of chuck slide 16 and chuck top jaw assembly 15.

Figure 2:
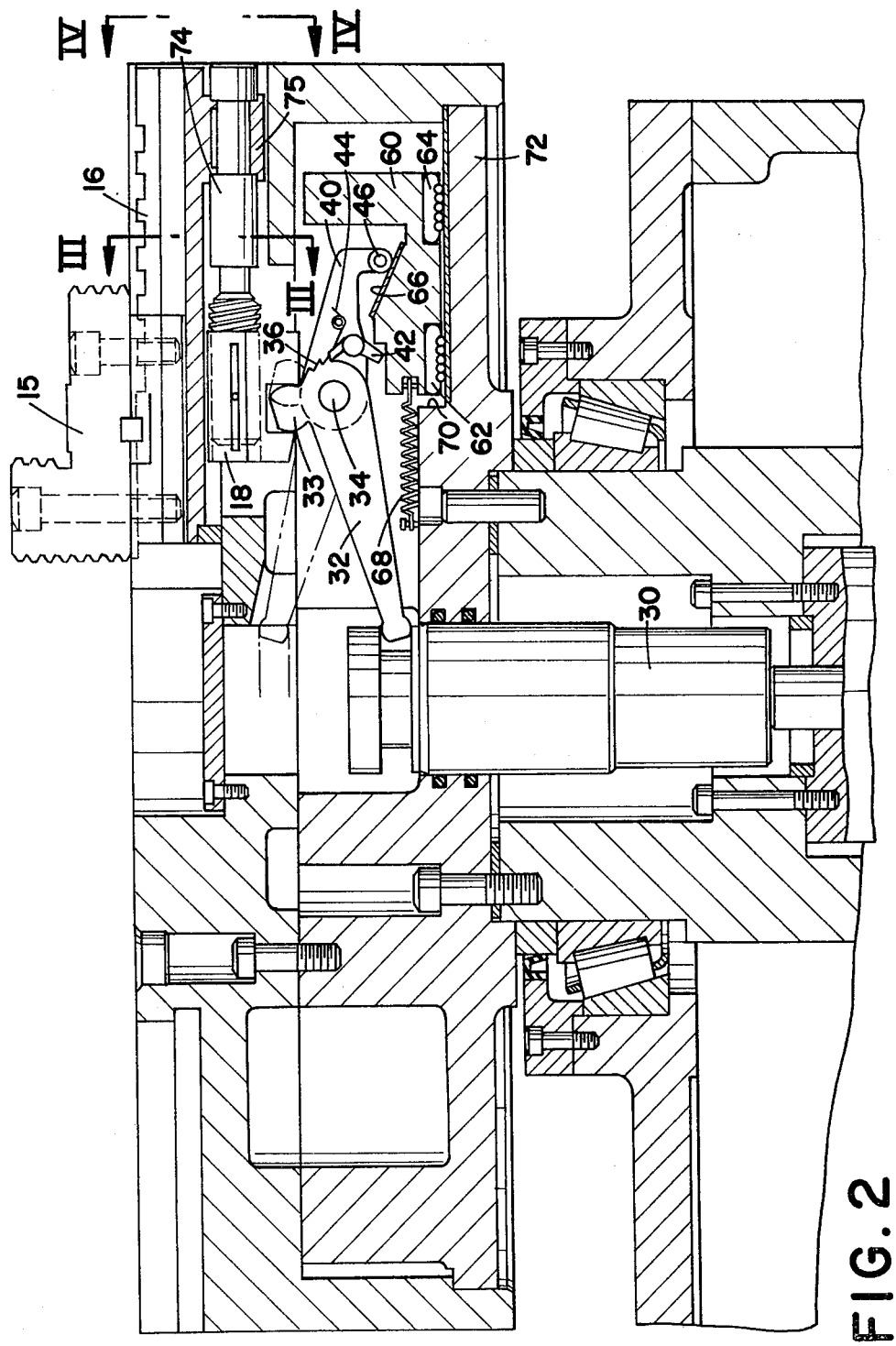
FIG. 2 is a view, partially in section, of a portion of a chuck having a counterbalance mechanism according to the present invention.
Figure 3:
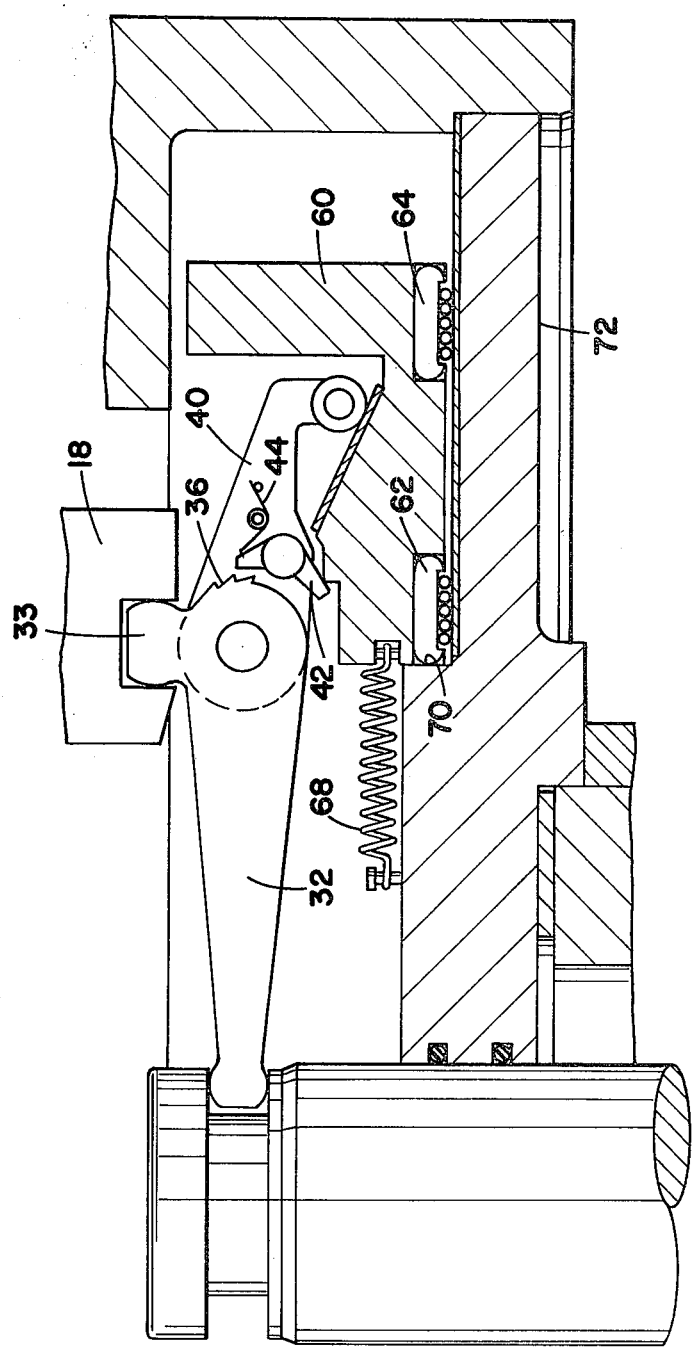
FIG. 3 is a view of a portion of the chuck assembly shown in FIG. 2 with the counter balance weight shown in the stop position disengaging the pawl from the ratchet.
Figure 4:
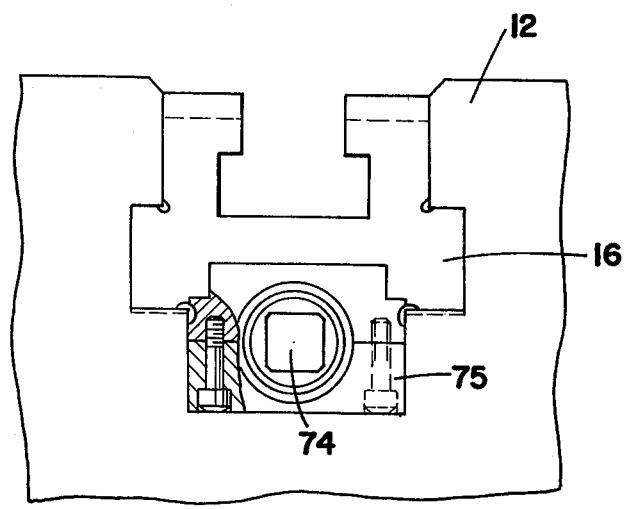
FIG. 4 is a view taken along the line IV—IV.

Inclined ramp 66 of counterweight 60 allows for a moderate vertical stroke of actuating rod 30. Roller 46 on lever extension 41 will still engage inclined ramp 66 when actuating rod 30 is anywhere within its moderate stroke. In cases where a long operating stroke is needed, FIGS. 2 and 3 show another embodiment where lever arm 31 and outward extention 41 are separate levers 32 and 40 respectively.

Primary lever arm 32 pivots around a pivot connection 34. A secondary lever arm 40 is arranged to pivot around pivot support 34, around which primary lever arm 32 also pivots. A ratchet section 36 is formed on primary lever arm 32. An upward extending portion 33 of lever 32 engages chuck slide 16. A pawl 42 is disposed on secondary lever 40. Pawl 42 is spring biased by a spring 44 towards engagement with the ratchet sections 36 formed on primary lever 32. The outer end of lever arm 40 carries a roller 46 mounted on a low friction bearing. Counterbalance weight 60, one of which is provided for each centrifugal compensating mechanism, is mounted on linear anti-friction recirculating rolling contact bearings 62 and 64. An inclined ramp 66 is provided on counterweight 60. The outer end of lever arm 40 carries a roller 46 which rests on the inclined portion of 66 of counterbalance weight 60. Weight spring 68 is provided for biasing counterweight 60 into engagement with a stop surface 70. Stop surface 70 is formed on the mounting flange 72 to stop the counterweight 60 in the proper relationship to secondary lever arm 40. In the stop position as shown in FIG. 3 pawl 42 is engaged and forced out of engagement with the ratchets 36 on primary lever arm 32. Thus, secondary lever arm 40 with counterweight 60 in the stop position, is not connected to primary lever arm 32. Motion of the primary lever arm 32 to engage and disengage the workpiece, with the chuck in a standstill position, may thus proceed in a normal manner.

When chuck 12 starts to rotate counterbalance weight 60 moves outward under centrifugal force. When pawl 42 is released by the outward motion of counterweight 60 spring 44 urges pawl 42 into engagement with one of the ratchet notches 36 formed on primary arm 32. This engaged position as shown in FIG. 2 causes primary lever arm 32 and secondary lever arm 40 to move in unison. The centrifugal force of counterweight 60 is thus transmitted through secondary lever arm 40 to primary lever arm 32 and chuck slides 16 thus balancing the centrifugal force of the chuck slide 16 and top chuck jaw 15 assembly.

Figure 6:
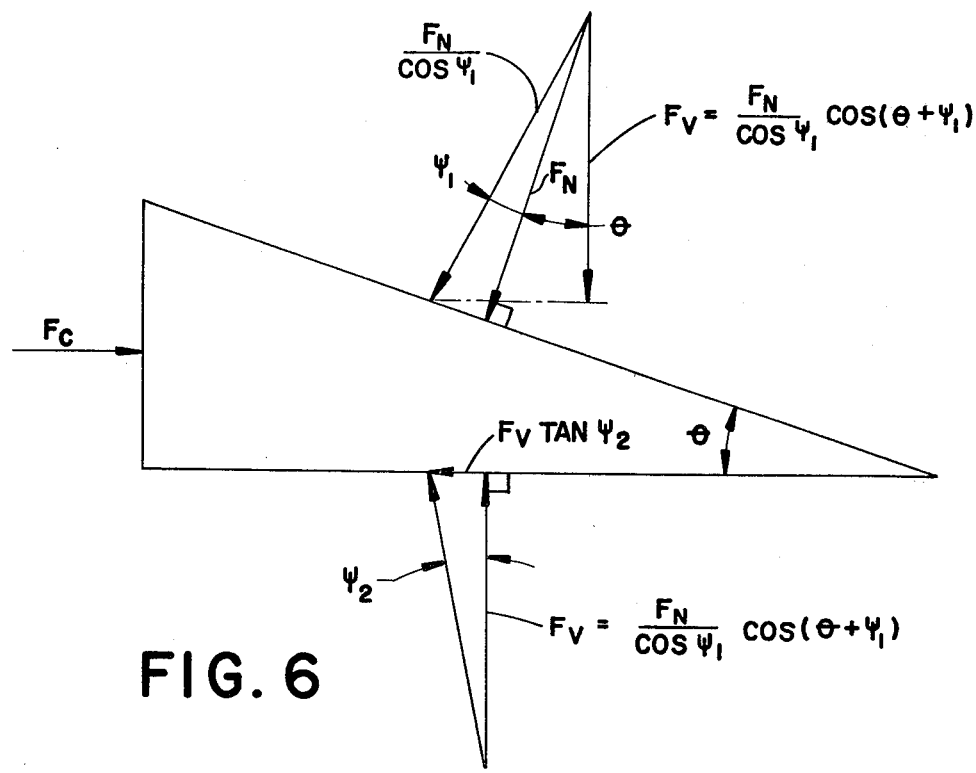
FIG. 6 is a force diagram of the forces acting of the counterweight.

It is important that counterweight 60 move with minimum friction. The angle of the inclined plane and the frictional forces resisting movement determine the ratio of the centrifugal force of the weight to the force transmitted to secondary arm 40. The force pattern in the mechanism is illustrated in FIG. 6. Inclined ramp 66 is elevated from the horizontal plane by angle $\theta$. Centrifugal force Fc on counterweight 60 is balanced by a Force $Fn/\cos\psi_1$, where Fn is the force normal to inclined ramp 66 and $\psi_1$ is the angle whose tangent is equal to the friction coefficient between roller 46 and inclined ramp 66, and by a force $Fv \tan\psi_2$, where Fv is the force in the vertical direction and $\psi_2$ is the angle whose tangent is equal to the coefficient of friction between roller bearings 62 and 64 and horizontal surface 73.

Thus:

$$Fc = (Fn/\cos\psi_1)\sin(\theta+\psi_1) + Fv\tan\psi_2$$

and since $Fv = (Fn/\cos\psi_1)\cos(\theta+\psi_1)$ $$Fc = (Fn/\cos\psi_1)\sin(\theta+\psi_1) + (Fn/\cos\psi_1)\cos(\theta+\psi_1)\tan\psi_2$$

With a secondary lever arm having the proportions illustrated in FIG. 2 and an inclined plane slope of 1/3 (the tangent of the angle $\theta$), the centrifugal force of the counterweight is increased by a factor of almost 10. This allows a moderately sized counterweight and requires no additional space within the chuck.

The arrangement shown in the figures is adapted specifically to vertical boring and turning machines. A similar arrangement can be provided for a horizontal turning machine by rearranging the guide bearings for the counterbalance weight and adding a spring bias to the secondary lever arm to maintain contact with the counterbalance weight.

I claim:
1. A chuck comprising;
    a plurality of chuck jaws;
    a first lever associated with each chuck jaw and positionable in response to positioning of said chuck jaw;
    a second lever pivotable around the same axis as said first lever;
    a ratchet formed on one of said levers;
    a pawl, spring biased towards engagement with said ratchet, formed on the other of said levers;
    a counterweight, spring biased towards a stop position;, urging said pawl out of engagement with said ratchet, and movable away from the stop position as the chuck rotates permitting said pawl to engage said ratchet and engaging said second lever to provide centrifugal force compensation.
2. A chuck as claimed in claim 1 comprising:
    low friction bearings supporting said counterweight for low friction movement.
3. A chuck as claimed in claim 1 comprising:
    a ramp portion formed on said counterweights; and,
    a roller formed on the end of said second lever and engaging the ramp portion of said counterweight to move said second lever as said counterweight moves outward.
4. A chuck having a plurality of chuck jaws and a centrifugal counterbalance associated with each jaw, said centrifugal counterbalance comprising:
    a first lever pivoted about an axis;
    connecting means for connecting said first lever to an associated chuck jaw for moving said first lever and said chuck jaw in unison;
    a second lever pivoted about the same axis as the first lever;
    a ratchet formed in one of said first or second levers;
    a pawl disposed on the other lever and being spring biased toward engagement with said ratchet;
    a counterweight, engaging and movable with respect to said second lever, spring biased towards a stop position engaging and lifting said pawl from engagement with said ratchet, and being movable as the chuck rotates, away from the stop position allowing said pawl to engage said ratchet to move said first lever as said second lever moves.
5. A chuck as claimed in claim 4 comprising:

an inclined portion, formed on said counterweight; which is engaged by the non-pivoting end of said second lever; and, a low friction bearing disposed on said second lever for engaging the inclined portion.

6. A chuck as claimed in claim 4 comprising:

low friction bearing supporting said counterweight for movement from said stop position.

7. A chuck having a plurality of chuck jaws and a centrifugal counterbalance associated with each jaw, said centrifugal counterbalance comprises:

a first lever pivoted about an axis;

connecting means for connecting said first lever to an associated chuck jaw for moving said first lever and said chuck jaw in unison;

a second lever pivoted about the same axis as said first lever;

latch means movable between a latched position, locking said first and second levers for movement together in one direction, and an unlatched position, permitting independent movement of said first and second levers;

a counterweight movable from a stop position, engaging and moving said latch means to an unlatched position, to a position, not engaging said latch means and where said latch means is in a latched position, and movable outward under centrifugal force to apply force to said second lever which is transmitted thru said first lever to said chuck jaws providing centrifugal force compensation.

8. A chuck as claimed in claim 7 comprising:

an inclined portion formed on said counterweight which is engaged by the free end of said second lever to transmit the compensating centrifugal force.

9. A chuck as claimed in claim 8 comprising:

biasing means for biasing said counterweight to a stop position.

10. A chuck as claimed in claim 7 wherein said latch means comprises:

a ratchet formed on one of said first or second lever;

a pawl, spring biased to engagement with said ratchet, formed on the other lever.

* * * * *